2,829,067

Patented Apr. 1, 1958

2,829,067

WOOD FINISHING COMPOSITION CONSISTING OF METHYLMETHACRYLATE RESIN AND BORAX

Jack Eastland, Atlanta, Ga., assignor to Eastland and Sapp, Atlanta, Ga., a partnership No Drawing. Application May 21, 1957
Serial No. 660,478

7 Claims. (Cl. 117—72)

This invention relates to protective and beautifying wood finishes and more particularly to a process for finishing wood and certain novel staining and sealing compositions used in the process.

This application is a continuation-in-part of my co-pending application for patent Serial No. 549,565, filed November 28, 1955, now abandoned, which was in turn a continuation-in-part of my application for patent Serial No. 461,690, filed October 11, 1954, now abandoned.

It has heretofore been known that dark finishes for wood require the use of dark stains and fillers, which must penetrate the wood sufficiently far to permit of at least fine or finish sanding before or after application of fillers, and before final protective finishes are applied.

The most useful stains for achieving desired colors, particularly deep or intense colors on wood, are the penetrating water-soluble dyes or stains. These are "water stains" of great depth and resistance to fading. Their use is subject to a serious drawback in that the water which is the solvent for these stains requires a relatively long drying period. Further, the use of water strongly raises the grain of the wood, which then requires further sanding. This generally involves the removal of substantial amounts of the surface, together with added labor and material costs as well as increasing the time required to complete the finishing process.

To avoid the disadvantages of water-soluble dyes, the wood finishing industry has heretofore commonly used as a practical commercial measure so-called non-grain-raising stains. Such stains contain water-soluble dyes dissolved in vehicles of the type of ethylene glycol, Carbitol and the like. While they dry rapidly and do not raise the grain of the wood, these vehicles can dissolve only a limited amount of dye. Therefore, their use may require up to three or more applications to the surface to be finished where a dark or strong color is to be achieved, because they have relatively much less intense staining properties. Furthermore, the results produced by use of non-grain-raising stains are not as clear, brilliant and light-fast, nor as uniform, as with the formerly used penetrating water stains. A common practice when these stains are used is to apply a wash coat of shellac or lacquer, which requires light sanding. Thus, any advantage which the non-grain-raising stains may have had over penetrating water stains by reason of their non-grain-raising properties is lost as a practical matter.

It is an object of this invention to provide a process for finishing wood in deep, strong colors which is rapid and which requires fewer steps than the formerly used production methods. Another object of this invention is to provide new sealing compositions for use in the said process. A further object of the invention is to provide new stain compositions for use in the process of the invention which also have sealing properties. Other objects will be apparent from the disclosure made hereinafter.

I have found that by employing as a vehicle or base for wood finishes an aqueous emulsion consisting of an acrylic resin dispersed in water together with certain sanding agents, to which can be added water-soluble dyes as well as other additives, compositions having both staining and sealing properties can be produced which make it possible to apply a superior finish to wooden surfaces in a relatively short time and with fewer operations than are normally required.

Broadly speaking, the resin emulsion composition vehicle or base of my invention comprises an aqueous acrylic emulsion together with a sanding agent, and to which can be added certain water-soluble dyes and viscosity and surface tension regulating agents. Additionally, lubricants, colored pigments, stabilizers and the like can be added thereto if desired.

For the preparation of the novel compositions of my invention, which are conveniently termed "dye-sealers" because of their dual function when they contain stains as compared with the stains of the prior art, I use a major portion consisting of an aqueous emulsion of an acrylic resin and a minor portion consisting of a sanding agent, as for example borax, alone or together with water-soluble dyes, plus viscosity and surface tension regulators. Thus, I can employ an aqueous emulsion containing an acrylic resin such as polymerized methyl methacrylate ranging in content from about 2% to about 60% by weight of the final composition. Although the above range of compositions is operative, for convenience of formulation I prefer to employ aqueous emulsions of polymerized methyl methacrylate ranging in content from about 2% upwards to about 35% by weight of the final sealing composition. For the above purposes any acrylic resin emulsion can be used, such as an emulsion of a polymerization product of acrylic acid in water, or an aqueous emulsion of a polymerization product of an ester of acrylic acid, as for example methyl acrylate or ethyl acrylate, or an aqueous emulsion of an ester of methacrylic acid, such as ethyl methacrylate, and the like. I prefer to employ polymerized methyl methacrylate, however, and a particularly convenient source of a methyl methacrylate resin emulsion is Rhoplex AC-33, a product manufactured by the Rohm and Haas Company of Philadelphia, Pennsylvania which contains about 45% of polymethyl methacrylate. I prefer to employ as an agent, to confer sanding properties upon the vehicle after drying, borax or sodium borate in amount of 0.074% to about 2.85% by weight. The maximum amount of this ingredient is actually governed solely by the quantity of water present in the composition; for example sodium tetraborate on an anhydrous basis is soluble only to the extent of about 2% in water at ordinary temperatures. Other water soluble sanding agents can of course be used in place of borax or sodium borate as will be apparent to those skilled in the art. As with borax and sodium borate, these sanding agents can be present up to the limit of their solubility in the acrylic resin emulsion. In practice, an upper limit for the sanding agent of about 2.85% by weight of the acrylic resin emulsion has been found feasible, although higher ranges are permissible.

The diluent of my compositions is water, and added thereto I can use any of the water-soluble dyes or stains, of the type heretofore well known to the art for their use in staining wood, in amounts ranging from 0.2% to the amount necessary to form a saturated solution in the basic emulsion vehicle which has as its ingredients polymethyl methacrylate emulsified in water and a water-soluble sanding agent such as borax. In practice, these water-soluble dyes or stains are present from about 0.2% to about 5% by weight of the basic emulsion vehicle.

Other additives and adjuvants can be used if desired, such as fungicides, say for example, boric acid, and the like, in effective amounts ranging from about 0.25% to about 3%; thickeners for increasing viscosity, as for example, inorganic thickeners such as bentonite, montmorillonite, purified montmorillonites comprising hydrous magnesium silicate and the like, and organic thickeners such as methyl cellulose, ethyl cellulose, carboxymethyl cellulose, hydroxyethyl cellulose, and the like; wetting agents, such as sodium lauryl sulfosuccinate, and the like; hiding pigments, such as titanium dioxide, iron oxide, lamp black and the like; water-soluble or water-emulsifiable waxes, such as the synthetic and natural waxes exemplified by carbowax and carnauba wax, respectively, and the like; and surface-tension reducing agents, such as ethylene glycol, diethlene glycol and the like.

I have found that it is very useful to add a sufficient amount of a thickening agent, such as hydroxyethyl cellulose or hydrous magnesium silicate to increase the viscosity of the dye-sealer composition according to the mode of application and the surface to which they are applied, to a point where no sagging will occur. However, when thickeners are added, they also increase the surface tension of the dye-sealer, and when used in amounts of 1.5% or more they prevent penetration of the pores or open grain of the wood. This produces novel effects where desired. However, I have found that the addition of a certain amount of a water-soluble glycol such as ethylene glycol, diethylene glycol and the like reduces the surface tension to a point where the dye-sealer fills the pores or open grain of the wood, without substantial effect on the viscosity and prevention of sagging. The amount of soluble glycol which I employ ranges from that amount just effective to reduce the surface tension up to about 4% by weight of the amount of resin solids in the emulsion. Thus, by the use of the said thickening agents, combined with surface-tension lowering agents, the extent to which the pores of the wood absorb the dye-seal by capillary attraction can be definitely and reproducibly controlled.

Particularly advantageous wood sealing compositions are those containing in addition to the basic emulsion vehicle, a hydrous magnesium silicate thickener present from about 0.2% to about 1% by weight of the final composition. This hydrous magnesium silicate is a highly purified magnesium montmorillonite containing on a dry basis about 56% silica, about 26% magnesia, and lesser amounts of calcium oxide, ferric oxide, alumina, and alkali metals. A suitable variety of a hydrous magnesium silicate is Ben-A-Gel, a product of the National Lead Company. The particular advantage of wood finishing compositions containing hydrous magnesium silicate as a thickener is the virtual elimination of lapping when applied to a surface and the increased ability of the emulsion present in the final wood finishing composition giving it a long shelf-life.

When the novel dye-seal compositions made in accordance with the above description are used for finishing wooden surfaces, I have found that great uniformity of color is produced even in dissimilar woods. Generally, no shading is necessary with my new compositions, whereas with conventional stains this procedure is always required in greater or less degree in production work. This elimination of shading or reduction in the amount of shading required results in a large decrease in cost of production, because shading is largely a manual operation. Thus, use of the dye-seal compositions of this invention is economical of both time and materials as well as yielding superior results.

Surprisingly, even though the vehicle of my novel dye-seal is water, the grain of the wood to which it is applied is raised only slightly, so that only a minimum amount of fine or light sanding is necessary. Thus, no more sanding is required than that which would be necessary following a wash coat. Furthermorme, the final finish when applied is invariably of much greater clarity, more resilience and much greater resistance to impact than the same final finish, be it one or more lacquer or varnish coats, applied over conventional stains and separate sealers. The finishes produced using my acrylic emulsion based dye-sealers are also much more cold-check resistant than conventional finishes.

An important advantage of the use of my novel sealing and dyeing compositions in wood finishing accrues from the substantial elimination of open grain and pin holes on the finished surfaces. This condition, which commonly is caused by film failure or the like during sealing operations, is almost impossible to detect in normal manufacturing procedures until after the finished article has gone through the rubbing process. By eliminating this cause for rejection of finished pieces, and the expensive re-working which is required to salvage such rejects, the new sealing composition brings about important savings in the costs of finishing wooden surfaces.

The compositions of my invention are employed for wood finishing as follows:

A wooden surface which has been smooth-sanded to any desired degree is stained to the color desired by brushing, spraying or wiping over the surface one application of a dye-sealer of the type described in the foregoing disclosure. Previous glue-sizing of the wood is not necessary. The stained, sealed surface is permitted to dry thoroughly in air at room temperature, which requires only about fifteen to thirty minutes, depending on the humidity and other factors such as percentage of water present in the dye-seal.

The stained and/or sealed surface is then sanded lightly to remove the very slightly raised grain.

The surface can now be finished with clear varnish or lacquer, if a filler is not required with the wood surface to be finished, e. g., gumwood.

If the nature of the surface requires a filler, any filler composition of the type known to the art is next applied by brushing, wiping or spraying, as desired. Any excess of filler which may be present is wiped off, and the filled surface is dried, at room temperature or with the use of heat as desired.

The surface is now ready for final varnish or lacquer finish coats. In some instances additional sealing coats will be required, but these will be reduced in number compared with the same article finished by conventional means. Any desired depth of color can be obtained in only one application of the dye-sealer composition of this invention.

The following examples will illustrate specific embodiments of the dye-seal compositions of my invention.

*Example 1.—Basic emulsion vehicle*

|  |  | Permissible range, percent |
|---|---|---|
| Methylmethacrylate resin | 85 lbs | About 2 to 60. |
| Borax | 7 lbs | About 0.076 to 2.85. |
| Water | 20 gals (About 166 lbs.) | About 37 to 97.8. |

Other sanding agents can be substituted for borax in this composition with an upper limit of the permissible range of 2.85%.

Conveniently, the methylmethacrylate resin is used in the form of an aqueous emulsion containing about 45% solids, thus furnishing a portion of the water used. The borax and the remainder of the water are added to the aqueous emulsion, and the mixture is thoroughly agitated until it is homogeneous. It is then ready for use. To the basic vehicle thus prepared can be added:

|  | Lbs. | Permissible range |
|---|---|---|
| Water-soluble dye (in sufficient amount). | 2 | About 0.1% to limit of solubility in basic emulsion vehicle (about 5%). |

Additionally there can be added agents which thicken or provide body to prevent sagging and/or raise surface tension where distinct pore characteristics are desired such as opaque finishes on walnut and mahogany, preservatives, surface-tension reducing agents, hiding pigments and the like, depending on the application to be made, as described hereinabove.

*Example 2.—Preparation of dye-seal, transparent mahogany color*

The following amounts of ingredients are used:

| | Lbs. | Permissible range, percent |
|---|---|---|
| Water | 200 | 37 to 97.8. |
| Aqueous methylmethacrylate resin emulsion containing 83.25 pounds of methylmethacrylate resin and 101.75 pounds of water, (Rohm and Haas AC 33, 45% solids). | 185 | 2 to 60. |
| Borax, finely powdered | 7 | 0.074 to 2.85. |
| Diethylene glycol | 4 | 0 to 4. |
| Boric acid | 2 | 0 to 2. |
| Hydroxyethylcellulose, 2% in water | 60 | 0 to 1. |
| Antifoam agent, Nopco 1497V (a modified amido condensation product obtainable from the Nopco Chemical Co., Harrison, N. J.). | 1 | 0 to 0.5. |
| Orange Y (calcocid) | 2 | 0 to 5. |
| Brilliant Red B | 2½ | 0 to 5. |
| Blue-black | ½ | 0 to 5. |

To the water are added successively, with continuous agitation, the borax, boric acid, diethylene glycol, antifoam agent, the dyes, hydroxyethylcellulose and the resin emulsion.

60 lbs. of a 3% suspension of a hydrous magnesium silicate in water can be used in place of the hydroxyethyl cellulose in the above composition.

After all of the acrylic emulsion has been added, the mixture is strained through a cloth or screen of about 32 mesh, and is then placed in suitable containers and is ready for use.

*Example 3.—Preparation of opaque dye-seal, grey colored*

The following ingredients are used.

| | Parts by Weight | Permissible Range, Percent |
|---|---|---|
| Water | 16 | 37 to 97.8. |
| Methylmethacrylate aqueous 45% emulsion containing 54 lbs. of methylmethacrylate resin and 66 lbs. of water, (Rohm and Haas AC 33). | 120 | 2 to 60. |
| Borax | 5 | 0.074 to 2.85. |
| Boric Acid | 1.5 | 0 to 2. |
| Hydroxyethyl cellulose, 2% in water | 45 | 0 to 1. |
| Titanium Dioxide, finely ground | 1.5 | 0 to 30. |
| Mapico black | 0.5 | 0 to 20. |
| Antifoam agent (Nopco 1497V) | 0.3 | 0 to 0.5. |
| Tamol 731 (Sodium salt of a carboxylated polyelectrolyte obtainable from Rohm & Haas Co., Philadelphia, Pa.)-Dispersing agent. | 0.3 | 0 to 0.5. |

The mixture is prepared as in Example 1 except that the titanium dioxide and Mapico black are ground with part of the water and are added last of all, with thorough stirring.

45 lbs. of a 3% water suspension of a hydrous magnesium silicate can be used in place of hydroxyethyl cellulose in the above composition.

*Example 4.—Composition for under-coating and the like*

To a basic emulsion vehicle, prepared as in Example 1, is added about 100 pounds of a 3% suspension of hydrous magnesium silicate in water. The final under-coating composition thus prepared has the following composition:

23.8% polymethyl methacrylate
1.9% borax
0.8% hydrous magnesium silicate
73.5% water

*Example 5.—Preparation of dye seal, basic*

The following amounts of ingredients are used:

| | Parts by Weight, Lbs. | Permissible Range, Percent |
|---|---|---|
| 3% suspension of hydrous magnesium silicate (Ben-A-Gel) in water. | 100 | 0 to 1. |
| Borax | 2 | 0.074 to 2.85. |
| Boric Acid | 2 | 0 to 2. |
| Antifoam agent (Nopco 1497B) | 1 | 0 to 0.5. |
| Diethylene glycol | 3.25 | 0 to 4. |
| Water | 150 | 37 to 97.8. |
| 45% polymethyl methacrylate suspension in water containing 83.25 lbs. of polymethacrylate and 101.75 lbs. of water. | 185 | 2 to 60. |
| | 443.25 | |
| Dyes | 5 | 0 to saturated solution. |
| | 448.25 (53 gals.) | |

The amount of dye used in the above composition is exemplary only, and the actual amount used will depend upon the strength of the dye, the depth of color desired and the solubility of the dye in the basic emulsion vehicle containing added ingredients, as above.

In preparing a dye seal of the above composition, the hydrous magnesium silicate and 1.5 lbs. of boric acid are ground in a pebble mill over night, with 100 lb. of water. The resulting suspension, the borax, the remainder of the boric acid, the dye, the antifoam agent, the diethylene glycol and about 75 lbs. of water are placed in a mixing tank and mixed at high speed for about 15 minutes. The balance of the water (75 lbs.) is then added and mixing is continued for ten more minutes. The mixing rate is cut to about half and the 45% polymethyl methacrylate emulsion is added steadily but gradually. After the addition is complete, mixing is continued one more minute and the resultant composition is strained through four thicknesses of cheesecloth into shipping containers.

The invention claimed is:

1. A wood finishing composition having as a major ingredient a basic emulsion vehicle containing about 2 to 60% by weight of a methylmethacrylate resin, about 0.074 to 2.85% by weight of borax and water to 100%, said methylmethacrylate resin being emulsified in the said water.

2. A wood finishing composition comprising a basic emulsion vehicle containing from about 2 to 60% by weight of a methyl methacrylate resin, about 0.074 to 2.85% by weight of borax, water to 100%, and as an added ingredient a water-soluble dye ranging in amout from that necessary to give a 0.2% solution to that necessary to give a saturated solution in the said basic emulsion vehicle.

3. A wood finishing composition comprising a basic emulsion vehicle containing from about 2 to 60% by weight of a methyl methacrylate resin, about 0.074 to 2.85% by weight of borax, water to 100%, and as an added ingredient a thickening agent in a concentration not to exceed 1% by weight of the final composition.

4. A wood finishing composition comprising, in combination, a basic emulsion vehicle about 2 to 35% by weight of a methyl methacrylate resin, about 0.12 to 2.85% by weight of borax and water to 100%, said methyl methacrylate resin being emulsified in water, and as an added ingredient a water-soluble dye ranging in amount from that necessary to give a 0.2% solution by weight in the basic emulsion vehicle to that necessary to give a saturated solution of the dye in the said basic emulsion vehicle.

5. A wood finishing composition comprising, in combination, from about 2 to 35% by weight of a methyl methacrylate resin, from about 0.12 to 2.85% by weight of borax, from about 0.2 to 1% by weight of a thickening agent, and a water-soluble glycol not to exceed 4% by weight and water to 100%, said methyl methacrylate resin being emulsified in said water.

6. The process of finishing wood surfaces, the step which comprises applying to said surface a composition comprising an aqueous emulsion of a methyl methacrylate resin containing about 35% by weight of resin and from 0.2 to 2.85% by weight of borax, and thereafter drying.

7. The process of claim 6 in which a substantially transparent finish coating is subsequently applied to the dried methylmethacrylate coating.

No references cited.